No. 809,851. PATENTED JAN. 9, 1906.
J. E. SCOTT.
ROASTER.
APPLICATION FILED JUNE 14, 1905.

Witnesses:
H. B. Hallock.
L. A. Morrison.

Inventor
John E. Scott
By
Atty.

UNITED STATES PATENT OFFICE.

JOHN E. SCOTT, OF PHILADELPHIA, PENNSYLVANIA.

ROASTER.

No. 809,851.     Specification of Letters Patent.     Patented Jan. 9, 1906.

Application filed June 14, 1905. Serial No. 265,130.

*To all whom it may concern:*

Be it known that I, JOHN E. SCOTT, a citizen of the United States, residing at Philadelphia, county of Philadelphia, and State of Pennsylvania, have invented a certain new and useful Improvement in Roasters, of which the following is a specification.

My invention relates to a new and useful improvement in roasting-pans, and has for its object to provide a roasting-pan in which the meat is held in a movable frame, so that the same may be turned, and the frame is provided with elongated dippers which will dip up the juice and allow the same to flow downward over the roast as the same is turned, thus automatically basting the meat.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
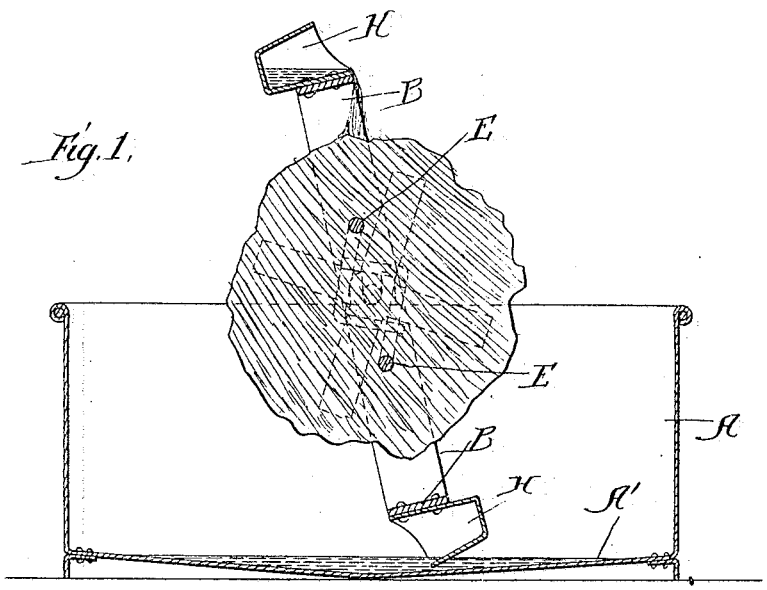
Figure 2:
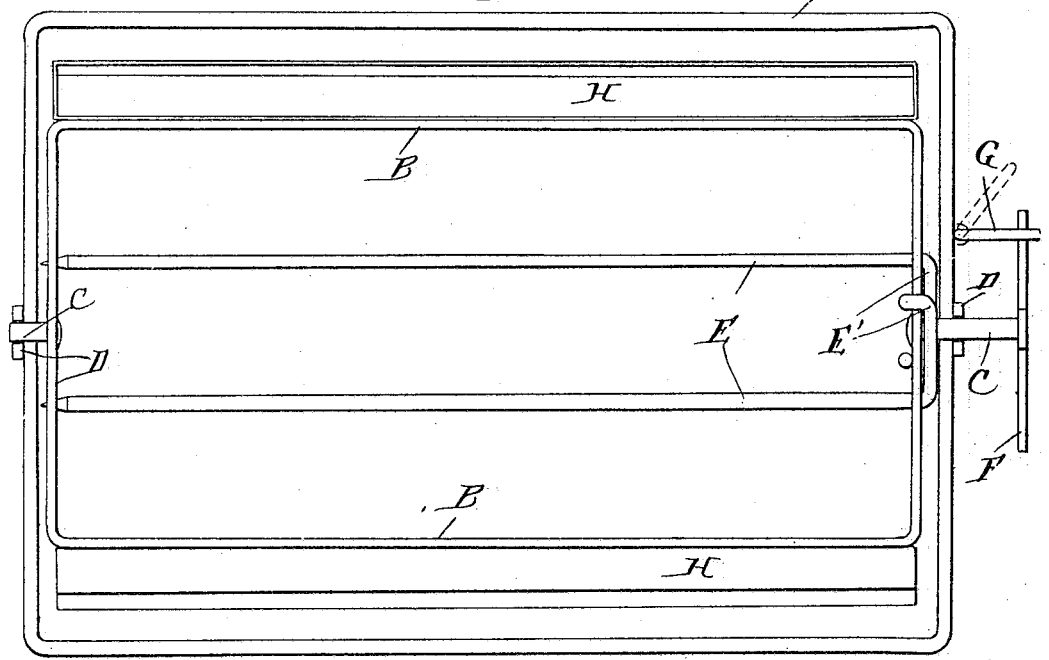

Figure 1 is a cross-sectional view through my improved roasting-pan; Fig. 2, a plan view of the same.

The pan A is made, preferably, rectilinear in shape, with straight vertical ends and sides, although the sides may be curved, if so desired. The bottom A' of the pan is inclined from each side downward toward the center, so that the juice from the meat will accumulate in the center of the pan.

B is a rectilinear frame provided in the middle at each end with a pivot C, which pivots are adapted to fit in forked bearings D, secured to the ends of the pan and extending upward therefrom. The roast is adapted to extend within this frame B and is secured thereto by two or more spits or pointed rods E, which extend through holes formed in the ends of the frame, extending longitudinally the full length of the frame through the roast. One end of each spit is pointed, the other end being formed hook shape, as indictated at E', so that it will hook over the end of the frame B and prevent the longitudinal displacement of the spits when secured in the roast. By simply turning one spit upon its axis the hook end E' can be disengaged from the frame and the spit pulled out. Of course any suitable means could be utilized for securing these spits in place. Upon the end of one of the pivots C may be secured a crank-arm, wheel, or any other device for turning the frame B, as indicated at F.

G is a swinging latch adapted to engage the crank-arm F and hold the frame in any position placed. Any form of device can be utilized for this purpose.

Secured to the outside of each side of the frame B are elongated dippers H. The open end of one points in an opposite direction to the open end of the other, and the frame and pan are so adjusted relative to one another that as the frame is turned upon its pivot the dippers will rotate in contact with or in close proximity to the lowest part of the bottom A' of the pan, so that any juice accumulated in the pan will be dipped up by the dipper and carried upward, and when this dipper reaches the highest point the juice will flow outward down upon the roast, and thus in order to baste the meat it is only necessary to rotate the frame several times and the meat is thoroughly basted upon every part of its surface.

Of course I do not wish to be limited to the exact construction here shown, as slight modifications could be made without departing from the spirit of my invention.

Having thus fully described my invention, what I claim as new and useful is—

1. In a roaster, a suitable pan, a frame mounted to rotate therein, dippers on the frame, and spits run through the frame and having ends bent to embrace the edges of the frame.

2. In a roaster, a suitable pan, a frame mounted to rotate in the pan, dippers on the frame, spits run through the frame at the side of the axis, said spits having hooked ends to engage the frame.

3. In a roaster, a pan, a frame having end apertures, mounted to rotate therein, a handle for turning the frames, dippers on the frame, spits run through the apertures of one end of the frame and having their ends lying in the apertures of the opposite end of the frame, and hooks on the spits adapted to embrace the edges of the frame.

In testimony whereof I have hereunto affixed my signature in the presence of two subscribing witnesses.

JOHN E. SCOTT.

Witnesses:
    JOHN CARSON,
    L. W. MORRISON.